May 13, 1958   H. J. EN DEAN ET AL   2,834,113
PIPELINE SURVEYING

Filed June 28, 1956   3 Sheets-Sheet 2

INVENTORS.
Howard J. En Dean,
John Delbert Jones and
BY  Edward Topanelian Jr.

ATTORNEYS

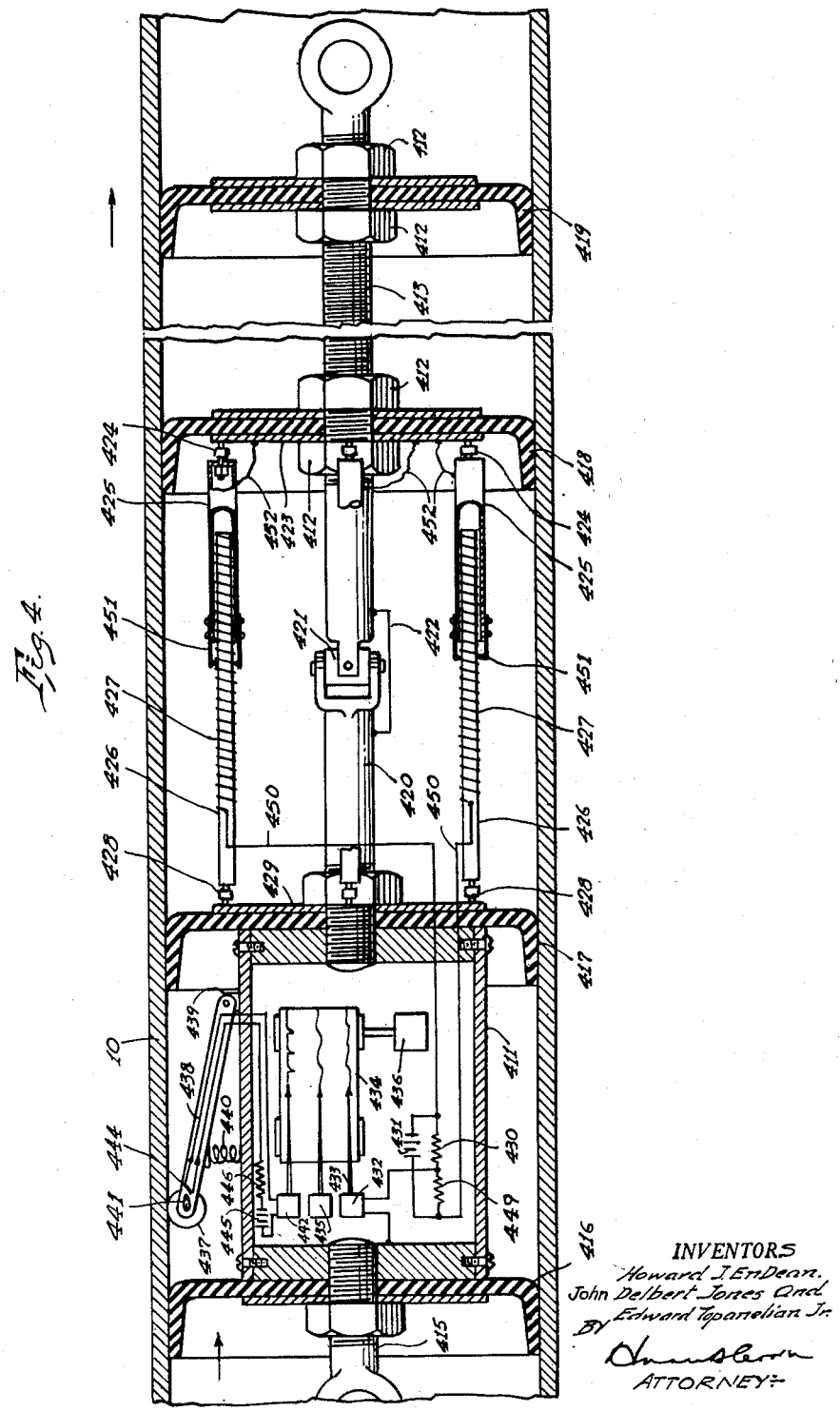

United States Patent Office 2,834,113
Patented May 13, 1958

2,834,113

PIPELINE SURVEYING

Howard J. En Dean, Fox Chapel, Pa., John Delbert Jones, Tulsa, Okla., and Edward Topanelian, Jr., Pittsburgh, Pa., assignors to Gulf Research & Development Company, Pittsburgh, Pa., a corporation of Delaware Application June 28, 1956, Serial No. 594,541

6 Claims. (Cl. 33—141.5)

This invention concerns a method and apparatus for surveying the spatial configuration of a pipeline, and in particular concerns a method and apparatus for ascertaining the grade (inclination) and the turns along a pipeline to which access may be had to the inside only and without observing the outside of the pipe.

It is common for pipelines which are built to transport fluids over long distances to traverse sparsely settled and often times very rugged terrain. While the grade and the location of bends, etc. of the pipe are well known from records made at its original laying, it is not uncommon for subsidence, landslides, earthquakes, floods, etc. to move portions of the pipeline. Furthermore, it may be difficult to ascertain the amount of movement produced by these catastrophes or by slow ground movement because the line is buried and not visible and expensive surveying procedures would be required even if the pipe were visible. Any movement of the pipeline may foretell a serious break in the pipe.

This invention provides a method and apparatus for surveying the grade and the components of curvature of a pipeline from the inside of the pipe without necessitating the use of personnel to observe the pipe and without interrupting the normal operation of the pipeline. Surveys may be made as often as desired at very small expense so that movement of any portion of the pipe may be promptly detected. The apparatus of this invention may be used in long pipelines which are used for transportation of fluids. The apparatus is placed in the pipeline and caused to traverse the inside of the pipe by the transported fluid, the apparatus being entirely free of any rigid physical connection to the ends of the pipeline.

It is accordingly an object of this invention to provide a method and apparatus for surveying the vertical and horizontal configuration of a pipeline.

It is another object of this invention to provide a method and apparatus for surveying the configuration of a pipeline from the inside only.

It is a further object of this invention to provide an apparatus which may be freely pumped from one end of the pipeline to the other and which records the grade and the components of curvature of the pipe traversed.

It is a further object of this invention to provide an apparatus for surveying the grade and the components of curvature of a pipeline as a function of another parameter which is indicative of position along the pipeline traverse.

It is a further object of this invention to provide an apparatus for surveying the spatial configuration of a pipeline as a function of distance along the pipeline.

It is a further object of this invention to provide an apparatus for surveying the spatial configuration of a pipeline as a function of time of traverse through the pipeline.

It is a further object of this invention to provide an apparatus for surveying the spatial configuration of a pipeline as a function of the pressure drop in the pipeline.

These and other useful objects of this invention are accomplished in the manner described in this specification of which the drawings form a part, and in which—

Figure 4 shows a diagrammatical view of an apparatus for surveying the curvature of a pipeline and recording the traversed distance along the pipeline.

The spatial configuration of a pipeline is determinable from a survey of its grade with respect to a horizontal plane and a survey of its curvature, the latter being composed of two quadrature components of known direction. Any change in these parameters along the pipeline in the course of time means that the pipe has shifted location for some reason. By grade is meant inclination of the pipe with respect to a horizontal plane.

The method of this invention comprises making the configuration survey from inside the pipe, this being done by measuring the grade inside the pipe and also measuring axial curvature inside the pipe. Observations of these parameters are made by pumping the apparatus of this invention through the inside of the pipe from one end of the pipeline to the other, that is, the apparatus is caused to traverse the inside of the pipeline by motion of the transported fluid.

The apparatus of this invention comprises an instrumentality which may be freely pumped through the pipeline and which is adapted to align its axis with that of the pipe and is capable of measuring and recording the grade and curvature as a function of some other parameter indicative of position along the pipeline traverse. The apparatus is launched in the pipeline at the dispatching station through a customary scraper trap and upon entering the pipe is pumped therethrough by the normal movement of the fluid transported by the pipeline. After traversing the pipeline the apparatus is recovered at a scraper trap at the receiving end of the line whereupon the record chart is removed and examined.

Figure 1:
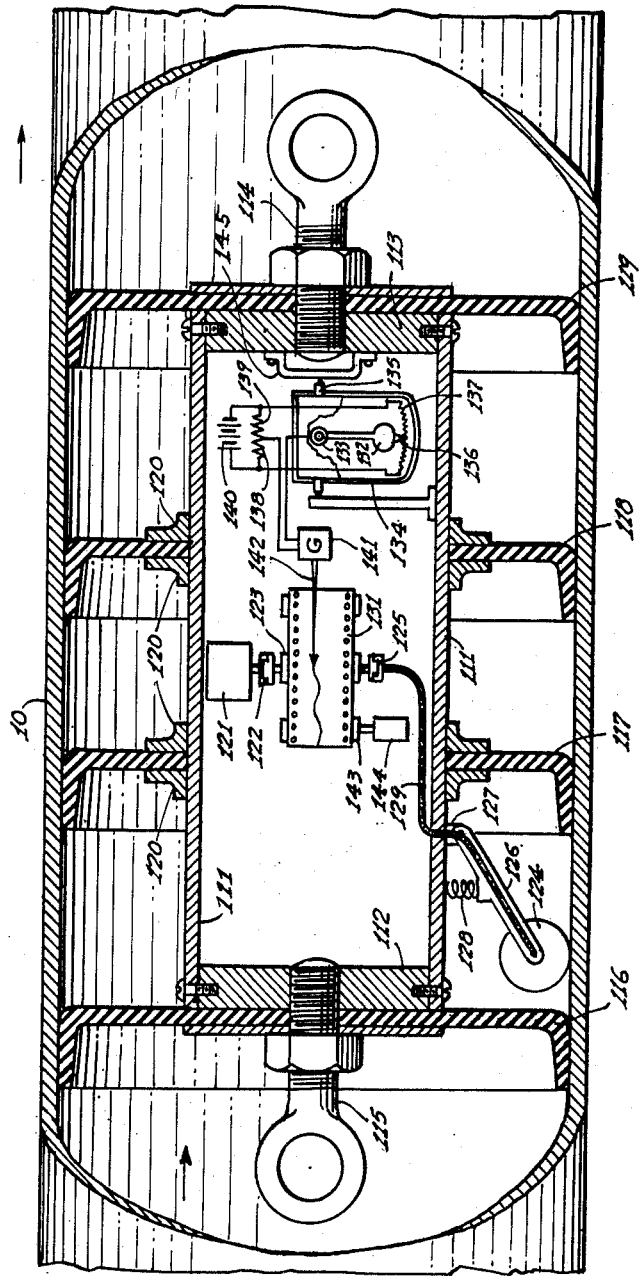
Figure 1 shows a diagrammatical view of an apparatus for surveying the grade (inclination) of a pipeline as a function either of distance along the pipeline or time of traverse.

Figure 1 is a diagrammatical view of an apparatus of this invention for surveying the inclination of a pipeline 10. In Figure 1 an instrument carrier or vehicle 111 comprises an outer cylindrical case which is sealed against entrance of pipeline fluid by end plates 112 and 113 fastened thereto as by screws as shown. Each end plate of the carrier has a central threaded hole into which eyebolts 114 and 115 are threaded. A nut and washer on the eyebolts 114 and 115 serve to clamp flexible rubber cup-shaped packers 116 and 119 to the ends of the carrier as shown. Additional packers 117 and 118 may be mounted between flanges 120 which are fastened to the exterior of the housing 111. The packers serve as means by which the transported fluid causes the carrier to traverse the pipeline. While only one packer is necessary for this purpose, the packers also serve to align the axis of the carrier 111 with the axis of the pipe 10. If but a single packer is used it is necessary that the carrier 111 have guide means (not shown) to maintain such alignment. Two or more packers are therefore preferred and four are shown in Figure 1 by way of example only.

In Figure 1 a pendulum 132 is mounted on a pivoted shaft 133 whose axis is transverse to the longitudinal axis of the carrier 111. The pendulum 132 and its shaft 133 are carried by a small housing 134 whose center of gravity is below its point of support. The housing 134 is hung on a pivot axis 135 which is parallel to or coincides with the longitudinal axis of the housing 111. The two axes 133 and 135 thus form a gimbal suspension for the pendulum 132. The small housing 134 together with the shaft 133 and pendulum 132 contained therein, thus seeks a downward position, and deflection of the pendulum 132 from the vertical axis of housing 134 is a measure of the inclination of the pipeline to the horizontal. The housing 134 also contains a viscous liquid such as heavy oil (not shown) which serves to damp the motion of the pendulum 132.

The pendulum 132 has at its lower end a contactor 136 which slides on potentiometer 137, the later being fixedly mounted inside the housing 134 in a plane parallel to the axis 135 of the housing and insulated therefrom. The ends of the potentiometer 137 are connected in a bridge circuit with the resistors 138 and 139 together with battery 140 as shown. A galvanometer 141 is connected between the junction of resistors 138 and 139, and the pendulum contact 136. Deflection of the galvanometer 141 will thus be a measure of the angular inclination or grade of the pipeline. Galvanometer 141 is equipped with pen 142 which records on the chart 131. By means of this device the inclination of the pipeline to the horizontal may be recorded as the carrier 111 traverses the pipeline.

The record chart 131 is driven by means of a clock 121 through a clutch 122, the clock being adapted to rotate record drum 123, at a uniform rate. The chart 131 may have edge perforations engaged by sprocket teeth on drum 123. The chart is wound up on take up reel 143 driven by a spring rewind mechanism 144. Alternatively the drum 123 may be driven by an odometer wheel 124 through a clutch 125. Only one of the clutches (122 or 125) is engaged for any one record. The odometer wheel 124 is mounted on an arm 126 pivoted on a bracket 127 fastened to the outside of carrier 111. A spring 128 urges the arm outward thus insuring that the wheel 124 makes good frictional contact on the inside wall of the pipe. Rotation of the odometer wheel 124 is transmitted to the inside of the carrier 111 by means of a flexible drive shaft 129 passing through a sealed bushing in the carrier. A gear box (not shown) may be interposed between the wheel 124 and the clutch 125 if desired.

The apparatus of Figure 1 thus gives a record of the grade or inclination of the pipeline either as a function of the distance along the pipeline (if clutch 125 is engaged) or simply as a function of the time of traverse (if clutch 122 is engaged). It is a simple matter to determine the location of any recorded grade in the first instance, since record distance is proportional to traverse distance. In the second instance, if the fluid is pumped at a uniform volumetric rate through uniform pipe, the pipeline distance to any recorded grade bears the same relation to the total length of traverse as the elapsed time from the start of the record until the grade is recorded bears to the total elapsed time of the traverse. If the rotation of chart 131 is uniform with time, then the latter times are further proportional to chart length.

The inclination or grade chart produced by the apparatus of Figure 1 is useful in checking the location of the pipeline and periodic successive surveys are particularly useful in detecting any changes in slope of the pipeline which may occur subsequent to its original installation. Thus for example, settling of the mid-section of a line where it traverses swamp land or quicksand may be ascertained by the inflection of the inclination curve recorded by the device of Figure 1. Similarly, if the pipeline is located part way up the side of a hill where sliding may take place, the record of the device will indicate the inclination and any change in grade of the pipeline will show up on successive periodic surveys.

Figure 2:
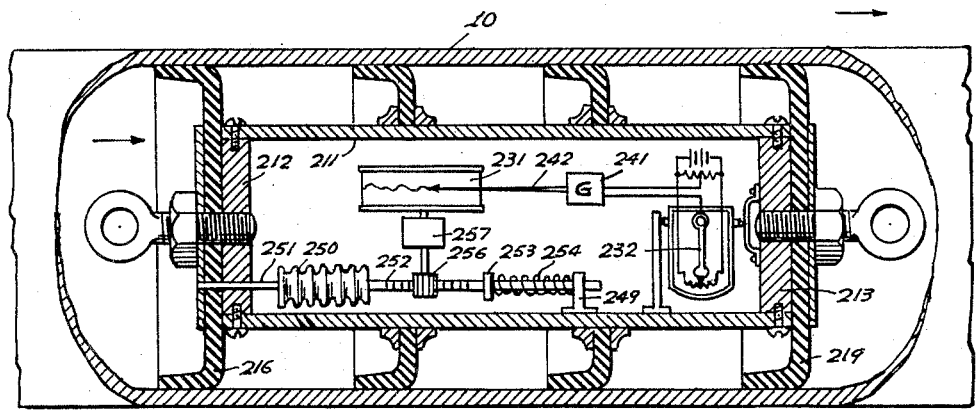
Figure 2 shows a diagrammatical view of an apparatus for surveying the grade (inclination) of a pipeline as a function of pressure drop along the pipeline.

Figure 2 illustrates an embodiment of this invention wherein the grade (inclination) of the pipeline is recorded as a function of the pipeline pressure. It is known that the pressure in a pipeline varies continuously from a high value at the input end to a lower value at the output end. Therefore, the local pressure may serve as an indication of location along the pipeline. In Figure 2 the carrier 211 is shown inside the pipe 10. The carrier is sealed at both ends to prevent the entrance of pipeline fluid. The carrier 211 is provided with two or more rubber cup-shaped packers, such as 216 and 219 which are clamped to the end plates 212 and 213. The packers serve as means by which the transported fluid causes the apparatus to traverse the pipeline and also serve to align the axis of the carrier 211 with the axis of the pipeline.

The means employed in the embodiment of Figure 2 to measure the grade of the pipe comprises pendulum 232 mounted on a gimbal suspension as described in detail in connection with Figure 1. The deflection of the pendulum relative to the axis of the housing 211 is transformed into an electrical signal as described in Figure 1 and recorded on chart 231 by means of galvanometer 241 and its pen 242. In Figure 2 the chart 231 is driven in proportion to variation in the pipeline pressure. A metallic bellows 250 inside the carrier 211 has its interior space connected to the pipeline fluid by means of a duct 251. The closed end of the bellows is attached to a rack 252 whose other end carries a pin or collar 253 which engages one end of a compression spring 254. The other end of the spring 254 abuts against a bracket 249 fastened to the carier. It is apparent that in the arrangement of Figure 2, the bellows will be expanded when the apparatus is launched at the input end of the pipeline due to the high pressure compressing spring 254. As the apparatus traverses the pipeline and the pressure becomes lower, the spring 254 will expand, thus moving the rack in proportion to the drop in pressure. Motion of the rack is converted into rotation by means of pinion 256 which engages the rack, the pinion being connected to drive the drum which carries the chart 231 through a gear box 257.

The embodiment of Figure 2 produces a record of grade or inclination as a function of pressure in the pipe. If the pressure varies linearly with distance from the input end of the pipeline to the output end and the chart motion is directly proportional to pressure drop, then the distance from the input end to the location of any desired anomaly on the record bears to the total length of pipeline traverse the same ratio as the length of chart from the beginning of the record to the anomaly bears to the total length of record. From this relationship the location can easily be computed. In practice certain corrections are necessary if the pipeline traverses hills or valleys but these are easily taken into account.

Figure 3:
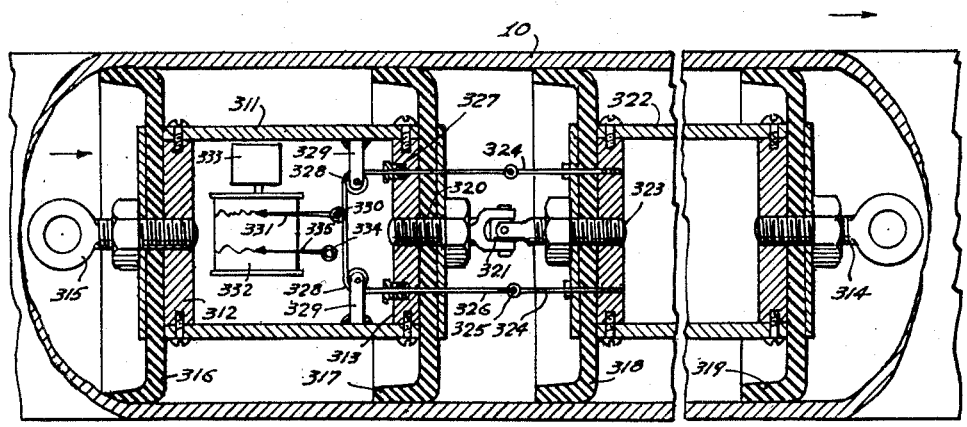
Figure 3 shows a diagrammatical view of an apparatus for surveying the curvature of a pipeline as a function of time of traverse through the pipeline.

Whereas a survey of the grade of the pipeline may in many instances be sufficient to detect movement of the pipe over a period of time, a complete configuration survey also requires that two components of curvature of the pipe be known. Figures 3 and 4 show apparatus for surveying the curvature and these may be combined with the apparatus of Figure 1 or 2 when a complete survey is to be made.

Referring to Figure 3, there is shown inside the pipeline 10 a sealed carrier 311 which has packers 316 and 317. The rear packer 316 is held on the end closure 312 by means of a nut and washer on eyebolt 315 as shown. The packer 317 is held on end closure 313 by means of nut and washer on a bolt 320, the latter being provided at its outer end with a universal joint 321. A second carrier 322, which need not be sealed, is provided with packers 318 and 319. The packers 316 and 317 serve to align the axis of carrier 311 with the axis of the pipeline, and likewise the packers 318 and 319 serve to align the axis of carrier 322 with the axis of the pipeline. Each carrier is thus aligned with the pipeline axis adjacent thereto and if the pipeline has a bend the two axes will not be in alignment with each other.

The packer 318 is mounted on the end of carrier 322 by means of a nut and washer carried on bolt 323, the latter also being connected to universal joint 321. In this manner the carriers 311 and 322 are prevented from rotating axially with respect to each other, but are permitted freedom of articulation of their axes. The packer 319 is mounted on the carrier 322 by means of a nut and washer on eyebolt 314. Carrier 322 may contain the apparatus of Figure 1 or 2 when a simultaneous grade survey is made. The near end of carrier 322 is provided with four stanchions 324 located equal radial distances out from the axis of the carrier 322 and spaced 90° thereabout. Only two of the stanchions 324 are shown in Figure 3 for clarity, the other two being respectively in front of and behind the bolt 323. Each stanchion 324 is provided with a small transverse hole or eye 325, the latter all lying in a transverse plane through the center of universal joint 321. A flexible metal cable or wire 326 is tied to one diametrically opposed pair of stanchions and passes through a hole and packing gland 327 in the end closure 313 of the other carrier 311. The holes and gland 327 are located in the same longitudinal plane as the respective associated stanchion and are the same radial distance from the axis of carrier 311. Inside the carrier 311 the cable passes over pulleys 328 each of which is carried on a bracket 329. Between the pulleys 328 the cable takes one or more turns around a small diameter shaft 330 pivoted on a fixed bracket (not shown). The shaft 330 is provided with a recording pen 331. The cable 326 runs taut from one eye 325 through a gland 327, over pulley 328, around the shaft 330, over the other pulley, through the other gland, and fastens to the other eye 325. If desired a stiff spring may be placed somewhere in the cable to keep it taut at all times. It is apparent that misalignment of the axis of carrier 311 with that of 322 caused by a bend of the pipe in the plane of Figure 3 gives rise to a corresponding rotation of shaft 330 which will be recorded by pen 331 on chart 332. The chart 332 is driven by a clock 333 so that a record is obtained showing the curvature of pipe 10 in the plane of Figure 3 as a function of time. Similarly the two stanchions not shown on Figure 3 which lie in an axial plane at right angles to Figure 3 are connected by another cable (not shown) through packing glands (not shown) and appropriate pulleys (not shown) inside the carrier 311, and this cable takes one or more turns around shaft 334. The shaft 334 is provided with a pen 335 and also records on chart 332. The record on chart 332 thus shows two curves, these being the angular misalignment of the two carriers 311 and 322 in two mutually perpendicular longitudinal planes. Inasmuch as the entire apparatus may rotate in the pipeline the planes are not identified but by weighting one side of the apparatus so that the weighted side always remains down, the two planes may thus become identifiable. Alternatively, means may be provided for recording the orientation of the apparatus about its longitudinal axis, so that the direction of the two components of curvature can be ascertained and such means will be described later.

Figure 4 shows a diagrammatical view of another embodiment of this invention for surveying the axial straightness or curvature of a pipeline. In Figure 4 the device comprises two sections, one of which carries the packers 416 and 417 and the other of which carries packers 418 and 419. Packers 416 and 417 are mounted on the sealed housing 411 which carries recording apparatus and other instrumentation (as described later) and serve to align the axis of carrier 411 with the axis of the immediately surrounding pipe 10. Packers 418 and 419 are fastened together by nuts 412 on the bolt 413 as indicated and serve to align the axis of bolt 413 with the axis of the surrounding pipe. On the trailing side of the packer 416 there is an eyebolt 415 which screws into the end plate of the housing 411 and with a nut clamps the packer 416 as shown. At the other end of the carrier 411, a bolt 420 is screwed into the end plate and clamps the packer 417 with a nut. The bolts 413 and 420 are mechanically connected at a point approximately midway between packers 417 and 418 by means of a universal joint 421. The universal joint 421 allows angular movement between the axes of the two bolts 420 and 413 but prevents relative rotation between them. An electrical connection 422 may be made between the bolts 413 and 420 for a purpose which will become evident later.

One of the washers 423 which serves to clamp the packer 418 is equipped at four equally-spaced points with universal joint attachments 424, to each of which is attached a tube 425 in such manner that each of the tubes may swivel in all directions about its attaching bracket 424. An electrical connection 452 may be made between each tube 425 and the washer 423 for a purpose which will become evident later. Extending into each tube 425 is a rod 426 made of electrical insulating material on which there is uniformly wound a resistance element 427. The left-hand end of each rod 426 is fastened by a universal joint attachment 428 to the washer 429 at equally-spaced points at the same radial distance as the universal joints 424. The universal joints 428 permit the rods 426 to swivel in all directions about their point of attachment. The end of each resistor 427 is connected by means of a wire 450 to the apparatus inside of the housing 411. One or more contact springs 451 are fastened to the outside of each tube 425 and serve to contact the associated resistance element 427 at a point which is fixed in distance with respect to the plate 423. All of the springs 451 contact their respective resistors 427 in the same transverse plane through the center of universal joint 421. The distance between the contacts 451 and the plate 429 however depends on the angular alignment between bolts 413 and 420, and that part of the respective resistance elements 427 in circuit will therefore depend on the angular alignment of the bolts 413 and 420.

There are two pairs of resistance units, each member of the pair being at diametrically-opposite points with the two pairs spaced 90° in azimuthal rotation. Only one pair of the resistance units are shown in Figure 4, one of the second pair lies behind the bolts 413 and 420, and the other member of the second pair is located in front of these bolts and has been omitted from the figure in order to show the universal joint 421. Inside the carrier 411 the wires 450 leading from diametrically-opposite resistance elements are connected to two resistors 449 and 430 as shown. The four resistance elements comprising resistors 449, 430, and the diametrically-opposite members 427, are connected in a Wheatstone bridge circuit energized by battery 431. Balance or unbalance of the bridge is indicated by galvanometer 432 which records by means of pen 433 on the recording chart 434. The bridge is initially adjusted so that when the axes of bolts 413 and 420 are in alignment the galvanometer pen indicates zero. Misalignment of the bolts 413 and 420 in the plane of Figure 4 will cause unbalance of the bridge and deflect galvanometer 432 by an amount and direction proportional to the angular misalignment of bolts 413 and 420. Misalignment of the bolts 413 and 420 in a longitudinal plane normal to the plane of Figure 4 will similarly cause unbalance of a similar bridge (not shown) connected to the other pair of resistance elements 427 (not shown in Figure 4), this bridge being connected to galvanometer 435 which also records on the chart 434.

In Figure 4 the chart 434 is driven by a motor 436 and the distance traversed along the pipeline is also recorded on the chart. This is accomplished by means of an odometer wheel 437 which is urged against the inside of the pipe line 10 by means of spring 440 pressing outward on an arm 438 pivotally mounted on a bracket 439 fastened to the outside of housing 411. The shaft of wheel 437 has a cam 441 which at each revolution closes electrical contacts 444. The contacts 444 are connected in an electric circuit comprising a battery 445, the galvanometer 442, and a suitable resistor 446. The curve drawn by galvanometer 442 thus shows kicks which occur at each revolution of the odometer wheel 437. The apparatus of Figure 4 thus draws three records on the chart 434, one curve representing misalignment of the bolts 413 and 420 in one plane, a second curve representing misalignment of bolts 413 and 420 in a plane normal thereto, and a third curve whose kicks represent distance traversed along the pipeline. It is apparent that the curvature of the pipeline at any point along its length may thus be determined by reading the two components of angle from the recorded curves. The resultant curvature may be computed in well-known manner from the geometry of the apparatus. In order to identify the two planes in which the curvature is measured, one side of the apparatus may be weighted to keep this side downward, or the apparatus may be combined with that of Figure 1 as will be described later.

The apparatus of Figures 3 and 4 is useful in checking the curvature of a pipeline where it traverses ground in which subsidence or other movement may occur, since subsidence of any part of the pipeline with respect to another part will introduce bends in the pipe. The sensitivity of the apparatus depends on the distance between the two articulated parts of the apparatus, and may be increased by lengthening the distance between inner packers 317 and 318 or 417 and 418 respectively. From the chart 434 showing the curvature of the pipe in two planes at all points it is possible to ascertain the location of the pipe and particularly to detect changes in curvature over an extended time.

In order to obtain a survey of the complete configuration of the pipeline it is necessary to know both the grade and the curvature, and it is also helpful to identify the two planes in which the curvature is measured. This may be done by combining the apparatus of Figure 1 with that of Figure 3 or 4. This is accomplished by mounting inside the carrier 322 of Figure 3 the apparatus shown inside the carrier 111 of Figure 1. In this embodiment of the invention, the galvanometer 141 of Figure 1 may be placed in the carrier 311 of Figure 3 so as to record on the same chart 332 as the pens 331 and 335. The resulting record will then show both the grade (inclination) and curvature in two planes for every point of the pipe as a function of the time of traverse, the latter being convertible to distance as previously explained. Alternatively, the apparatus of Figure 1 may be combined with that of Figure 4 to obtain the same result.

Figure 5:
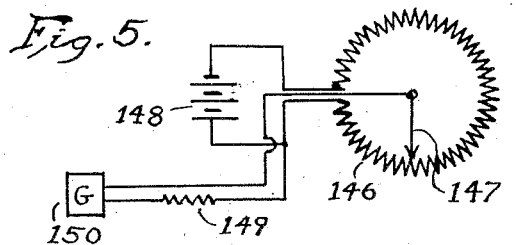
Figure 5 shows a wiring diagram of a circuit for ascertaining and recording the azimuthal orientation of the embodiments of Figures 1 to 4 about their longitudinal axis.

Still further improvement is accomplished by adding to the pendulum apparatus of Figure 1, electrical means for recording the orientation of the housing 134 about its axis 135 as shown diagrammatically in Figure 5. This is done by mounting on the bracket 145 a circular potentiometer 146 (not shown in Figure 1) whose axis coincides with the axis 135. The housing 134 carries a contact arm 147 which slides on the potentiometer. Electrical connections are made according to the circuit shown in Figure 5, the battery 148 being connected across the potentiometer 146 and a voltmeter circuit connected from the contactor 147 to one end of the potentiometer. The voltmeter circuit comprises a high resistance 149 in series with a galvanometer 150. Accordingly, the deflection of the galvanometer 150 is a measure of the angular position of the housing 134 about the longitudinal axis of the carrier 111. The galvanometer 150 may record on the same chart 131 as galvanometer 141 in Figure 1 or on the same chart as is used in the embodiments shown in the other figures. The record thus obtained will indicate the grade (inclination) of the pipe, its curvature in two planes, and the orientation of the apparatus about its axis, these being in correlation with time of traverse, distance along the traverse, or pressure drop in the pipeline. With this information it becomes possible to compute accurately the configuration of the pipe at every point of the pipeline and easily ascertain any change in the configuration which may take place from time to time.

Whereas the figures illustrate means for surveying and recording configuration parameters of the pipeline as a function of time, distance, or local pressure, it is within the purview of this invention to correlate the indications of the configuration-paramter-measuring means and the location-parameter-measuring means by other means. Thus for example the time, distance, or local pressure can itself be recorded on the charts 131, 231, 332 in a manner similar to that illustrated in Figure 4 to record distance. Conversely in the embodiment of Figure 4 the chart 434 may be driven in proportion to distance by employing of a flexible drive cable connecting the odometer wheel 437 to a chart driving drum such as is illustrated in Figure 1.

Certain aspects of this invention are disclosed and claimed in copending applications Serial Nos. 594,405; 594,482; 594,483; 594,577; 594,641; 594,642; and 594,643; all of which are by the same applicants and are assigned to the same assignee as the present application.

It is contemplated that the apparatus disclosed herein may be operated in conjunction with other apparatus for example that disclosed in the afore-mentioned copending applications in order to make two or more simultaneous surveys of different parameters of the pipeline. For making such a multipurpose survey of the pipeline, it is within the purview of this invention to provide a train of instrumentalities without packers and which may be tied together with couplers, the train being pulled by one or more motive units with the motive unit equipped with one or more packers which serve to allow the pumped fluid to push the motive unit through the pipeline, thereby causing the entire train to traverse the pipeline. In such a train the packer on the motive unit is equivalent to a packer on the instrument vehicle since it serves as the means by which the pumped fluid causes the vehicle to traverse the pipeline. When such a motive unit is employed the instrument carriers described herein are provided with guides which serve to align the axis of the carrier with the axis of the pipeline.

It is also contemplated that prior to running the apparatus disclosed herein, one or more scrapers or other known cleaning devices may be pumped through the pipeline in order to prepare the pipeline for a survey. It is further contemplated that any of the devices shown herein may itself be equipped with one or more scraper sections if such is necessary to obtain a reliable survey. Furthermore, the number of packers used on the instrument carrier may be varied to suit conditions and in some cases it will suffice to use but a single packer together with one or more guides to maintain the longitudinal axis of the apparatus in proper alignment with the axis of the pipe.

What we claim as our invention is:

1. Apparatus for surveying the spatial configuration of a pipeline which comprises a first vehicle insertable in the pipe, a second vehicle insertable in the pipe connected to said first vehicle by a universal joint, a packer on one of said vehicles adapted to form a sliding seal against the wall of the pipe, means on each of said vehicles adapted to align the axis of each vehicle with the axis of the pipe adjacent thereto, means on at least one of said vehicles responsive to angular misalignment between the axes of said vehicles, means in at least one of said vehicles responsive to a parameter indicative of the location of the vehicle in the pipe, and means in at least one of said vehicles adapted to record the correlation between the response of said angle-responsive means and the response of said parameter-responsive means.

2. Apparatus for surveying the spatial configuration of a pipeline which comprises a first vehicle insertable in the pipe, a second vehicle insertable in the pipe connected to said first vehicle by a universal joint, a packer on one of said vehicles adapted to form a sliding seal against the wall of the pipe, means on each of said vehicles adapted to align the axis of each vehicle with the axis of the pipe adjacent thereto, means on at least one of said vehicles responsive to angular misalignment between the axes of said vehicles, time-responsive means in at least one of said vehicles, and means in at least one of said vehicles adapted to record the correlation between the response of said angle-responsive means and the response of said time-responsive means.

3. Apparatus for surveying the spatial configuration of a pipeline which comprises a first vehicle insertable in the pipe, a second vehicle insertable in the pipe connected to said first vehicle by a universal joint, a packer on one of said vehicles adapted to form a sliding seal against the wall of the pipe, means on each of said vehicles adapted to align the axis of each vehicle with the axis of the pipe adjacent thereto, means on at least one of said vehicles responsive to angular misalignment between the axes of said vehicles, means in at least one of said vehicles responsive to distance traversed by said vehicle, and means in at least one of said vehicles adapted to record the correlation between the response of said angle-responsive means and the response of said distance-responsive means.

4. Apparatus for surveying the spatial configuration of a pipeline which comprises a first vehicle insertable in the pipe, a second vehicle insertable in the pipe connected to said first vehicle by a universal joint, a packer on one of said vehicles adapted to form a sliding seal against the wall of the pipe, means on each of said vehicles adapted to align the axis of each vehicle with the axis of the pipe adjacent thereto, means on at least one of said vehicles responsive to angular misalignment between the axes of said vehicles, pressure-responsive means in at least one of said vehicles communicating with the fluid in the pipe, and means in at least one of said vehicles adapted to record the correlation between response of said angle-responsive means and the response of said pressure-responsive means.

5. Apparatus for surveying the spatial configuration of a pipeline which comprises a first vehicle insertable in the pipe, a second vehicle insertable in the pipe connected to said first vehicle by a universal joint, a packer on one of said vehicles adapted to form a sliding seal against the wall of the pipe, means on each of said vehicles adapted to align the axis of each vehicle with the axis of the pipe adjacent thereto, a cord-like member connecting said vehicles on a line off the axis of said vehicles, means on one of said vehicles responsive to longitudinal movement of said cord relative to at least one of said vehicles, means in at least one of said vehicles responsive to a parameter indicative of the location of the vehicle in the pipe, and means in at least one of said vehicles adapted to record the correlation between the response of said cord-movement-responsive means and the response of said parameter-responsive means.

6. Apparatus for surveying the spatial configuration of a pipeline which comprises a first vehicle insertable in the pipe, a second vehicle insertable in the pipe connected to said first vehicle by a universal joint, a packer on one of said vehicles adapted to form a sliding seal against the wall of the pipe, means on each of said vehicles adapted to align the axis of each vehicle with the axis of the pipe adjacent thereto, a variable electrical resistor, means mechanically connecting said resistor between said vehicles off the axis of said vehicles and in such manner that the resistance thereof varies with distance between said points of connection, an electrical source on one of said vehicles, an electrical circuit on at least one of said vehicles including said electrical source and said variable resistor, means in at least one of said vehicles connected to said circuit and responsive to changes in the electric current in said circuit, means in at least one of said vehicles responsive to a parameter indicative of the location of the vehicle in the pipe, and means in at least one of said vehicles adapted to record the correlation between the response of said electric-current-responsive means and the response of said parameter-responsive means.

References Cited in the file of this patent

UNITED STATES PATENTS

| Number | Name | Date |
|---|---|---|
| 252,956 | Loane | Jan. 31, 1882 |
| 1,187,519 | Galvin | June 20, 1916 |
| 1,877,249 | McHugh et al. | Sept. 13, 1932 |
| 1,901,567 | Rogatz | Mar. 14, 1933 |
| 1,907,167 | Williams | May 2, 1933 |
| 2,656,616 | Hewitt | Oct. 27, 1953 |
| 2,674,049 | James | Apr. 6, 1954 |